United States Patent
Bunge et al.

(10) Patent No.: US 9,264,169 B2
(45) Date of Patent: Feb. 16, 2016

(54) METHOD FOR THE ADAPTIVE CONFIGURATION OF THE TRANSMISSION SPECTRUM IN WDM-PONS

(71) Applicant: DEUTSCHE TELEKOM AG, Bonn (DE)

(72) Inventors: Christian-Alexander Bunge, Leipzig (DE); Christoph Lange, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/409,502

(22) PCT Filed: Jun. 21, 2013

(86) PCT No.: PCT/EP2013/063041
§ 371 (c)(1),
(2) Date: Dec. 19, 2014

(87) PCT Pub. No.: WO2013/190110
PCT Pub. Date: Dec. 27, 2013

(65) Prior Publication Data
US 2015/0180605 A1    Jun. 25, 2015

(30) Foreign Application Priority Data

Jun. 22, 2012  (DE) .......................... 10 2012 210 581

(51) Int. Cl.
*H04J 14/02*            (2006.01)
(52) U.S. Cl.
CPC ......... *H04J 14/0239* (2013.01); *H04J 14/0221* (2013.01); *H04J 14/0247* (2013.01); *H04J 14/0282* (2013.01); *H04J 14/0298* (2013.01)

(58) Field of Classification Search
CPC .................................................. H04J 14/0239
See application file for complete search history.

(56) References Cited

U.S. PATENT DOCUMENTS

| 2010/0028002 | A1* | 2/2010 | Qian et al. | 398/79 |
| 2010/0215368 | A1* | 8/2010 | Qian et al. | 398/67 |
| 2014/0334823 | A1* | 11/2014 | Tamaki et al. | 398/72 |

FOREIGN PATENT DOCUMENTS

| EP | 2200202 A1 | 6/2010 |
| EP | 2472760 A1 | 7/2012 |

OTHER PUBLICATIONS

"Nokia Siemens Networks Future optical connectivity", Apr. 10, 2012, pp. 1-8, XP055083832.

(Continued)

*Primary Examiner* — Nathan Curs
(74) *Attorney, Agent, or Firm* — Leydig, Voit & Mayer, Ltd.

(57) ABSTRACT

A method for adaptive configuration of a transmission signal in a coherent Wavelength-Division Multiplexing-Passive Optical Network (WDM-PON) having an optical line termination and a plurality of end nodes includes: (a) generating, by at least m lasers, the transmission signal; (b) monitoring the $k_a$ active end nodes; (c) if the number of active end nodes is reduced to $k_a \leq (m-1)*p$: reassigning active end nodes associated with a spectral range of a laser to be switched off to a respective free spectral range of another laser, announcing the new assignment of the spectral ranges by transmitting a message to one or more end nodes assigned to the laser to be switched off, and switching off the laser to be switched off; and (d) if the number of active end nodes increases to $k_a > m*p$: switching on an additional laser.

6 Claims, 3 Drawing Sheets

(56) References Cited

OTHER PUBLICATIONS

Bianchi, et al., "Survey of Next-Generation Optical Access System Concepts", Jun. 21, 2012, pp. 1-168, XP55083858.
Rohde, et al., "Next Generation Optical Access: 1 Gbit/s for Everyone", 35$^{th}$ European Conference on Optical Communication, 2009. ECOC '09, Vienna, Austria, IEEE, Sep. 20, 2009, pp. 1-3, XP031546541.
Gottwald, et al., "Machbarkeit kohärenter Einfasser-UDWM PONs mit 1000 Teilnehmern and 100 km Reichweite", ITG-Fachtagung Photonische Netze, Paper 12, May 2010, May 3, 2012, XP055083578.
Keiser, "Concepts and Applications", Dec. 2006, pp. 13-14.
Grobe, et al., "PON in Adolescence: From TDMA to WDM-PON", IEEE Communications Magazine, pp. 26-34, Jan. 2008.
ITU-T Series G, G.987, 10-Gigabit-capable passive optical networks, Oct. 2010.

\* cited by examiner

METHOD FOR THE ADAPTIVE CONFIGURATION OF THE TRANSMISSION SPECTRUM IN WDM-PONS

CROSS-REFERENCE TO RELATED APPLICATIONS

This application is a U.S. National Phase application under 35 U.S.C. §371 of International Application No. PCT/EP2013/063041, filed on Jun. 21, 2013, and claims benefit to German Patent Application No. DE 10 2012 210 581.6, filed on Jun. 22, 2012. The International Application was published in German on Dec. 27, 2013, as WO 2013/190110 A1 under PCT Article 21(2).

FIELD

The present invention relates to the general field of telecommunications, in particular to line-based optical access networks.

BACKGROUND

Energy demand and energy efficiency of telecommunications networks have recently become a greater center of attention. In view of the critical requirement of sustainable use of resources it will also be expected in future that an energy-efficient network operation will be indispensable for telecommunications network operators and telecommunications service providers.

In particular access networks have a large share in the energy demand of today's telecommunications networks since the network elements are dispersed over a wide geographical space and the network has a great number of active components—at least at the networks' boundaries. Passive Optical Networks, PONs, are considered by many network operators to be the next step in the further development of access networks and are currently further expanded in order to ensure future-proof optical access networks for high-bit usage.

It is assumed that at first the generation of the Gigabit-capable PON [2] and subsequently the also already standardized variant XG-PON1 [4] will be used. These PON variants are based on an Optical Distribution Network, ODN, which uses as central element an optical power coupler which is wavelength-independent and distributes the signals from the central node uniformly—i.e., not frequency or wavelength selective—to all end nodes. For the future of line-based optical access networks going beyond the XG-PON1, PON variants are discussed which use the Wavelength-Division Multiplexing, WDM, in order to be able to provide per end node higher transmission bit rates per connection by providing exclusive wavelength channels. Among the various variants discussed are such of particular interest which can still use the mentioned optical distribution network—further developed for G-PON and XG-PON1—and consequently continue to use a passive optical power coupler as well. Thus, the partly great financial resources required for a nationwide expansion of fiber optic access networks can be guarded over a longer period of time. Such a method is the UDWDM-PON based on coherent superheterodyne receivers on which the present description of the invention is based [1].

Published references referred to herein:

[1] H. Rohde et al, "Next generation Optical Access: 1 Gb/s for Everyone", in Proceedings European Conference on Optical Communication (ECOC) 2009, Paper 10.5.5.

[2] Keiser, Gerd: FTTX—Concepts and Applications. Hoboken, N.J.: Wiley, 2006 (pages 13-14)

[3] ITU-T Series G. Supplement 45: Means and impact of GPON power saving. White Paper, Genf, 2009

[4] ITU-T Series G, G.987: 10-Gigabit-capable passive optical networks, Geneva 2010

[5] E. Gottwald, H. Rohde, S. Smolorz, "Machbarkeit kohärenter Einfaser-UDWDM PONs mit 1000 Teilnehmern und 100 km Reichweite", 11. ITG Fachtagung Photonische Netze, Paper 12, 05/2010.

[6] Klaus Grobe, Jörg-Peter Elbers: PON in Adolescence: From TDMA to WDM-PON. IEEE Communications Magazine, pages 26-34, January 2008

SUMMARY

In an embodiment, the invention provides a method for adaptive configuration of a transmission signal in a coherent Wavelength-Division Multiplexing-Passive Optical Network (WDM-PON) having an optical line termination and a plurality of end nodes. The method includes: (a) generating, by at least m lasers, the transmission signal, wherein each of the at least m lasers is associated with a respective optical transmission spectrum having p associated spectral ranges, wherein a spectral range of the transmission signal is suitable for transmitting data in the coherent WDM-PON to an associated active end node of $k_a$ active end nodes, wherein a respective active end node of the $k_a$ active end nodes is associated with a spectral range of the m lasers and wherein $k_a \leq m \cdot p$, $m=\{1, 2, 3, 4, \ldots\}$ and $p=\{1, 2, 3, 4, \ldots\}$; (b) monitoring the $k_a$ active end nodes; (c) if the number of active end nodes is reduced to $k_a \leq (m-1) \cdot p$: reassigning active end nodes associated with a spectral range of a laser to be switched off to a respective free spectral range of another laser, announcing the new assignment of the spectral ranges by transmitting a message to one or more end nodes assigned to the laser to be switched off, and switching off the laser to be switched off; and (d) if the number of active end nodes increases to $k_a > (m+1) \cdot p$: switching on an additional laser.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
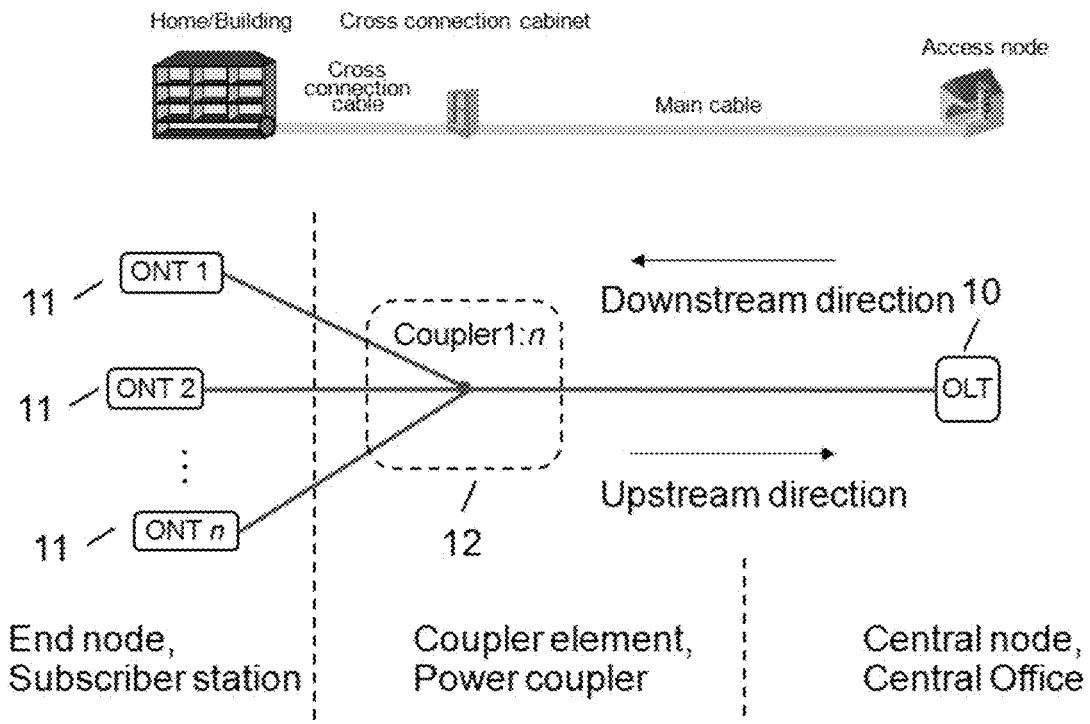
FIG. 1 schematically shows an access network based on a passive power coupler-based optical network.

Against the background of the relatively high share of the access networks in the total energy consumption of the telecommunications networks and the, in the long run, highly promising approach of coherent WDM-PON technique, network operators are particularly practically interested in increasing the energy efficiency of such future PON systems in view of sustainability and economic efficiency.

Embodiments of the present invention provide a method and an apparatus for transmitting a transmission signal in optical networks, wherein the energy efficiency is improved.

The invention includes flexibly configuring, in passive optical networks operated coherently in wavelength-division multiplexing, WDM-PON, the transmission spectrum in the exchange-side network element "Optical Line Termination", OLT, such that, based on the chronologically varying traffic requirements, components in the OLT can be load-adaptively switched-on and off to achieve an improved energy efficiency of the network operation. According to the invention, the transmission capacity provided is adapted to the respective current traffic need in order to increase the energy efficiency by using as few lasers as possible. To this end, adaptive mechanisms are used, which are described below.

According to an aspect of the invention, a method for the adaptive configuration of a transmission signal in a coherent WDM-PON having an optical line termination and several end nodes is provided. The method comprises the following steps: (a) producing the transmission signal by means of at least m lasers, which are each associated with a respective optical transmission spectrum having p associated spectral ranges, wherein a respective spectral range of the transmission signal is suitable for transmitting data in the coherent WDM-PON to an associated active end node of $k_a$ active end nodes, wherein a respective active end node of the $k_a$ active end nodes is associated with a spectral range of the m lasers and wherein $k_a \leq m \cdot p$, $m = \{1, 2, 3, 4, \ldots\}$ and $p = \{1, 2, 3, 4, \ldots\}$; (b) monitoring the number $k_a$ of active end nodes; (c) reassigning each active end node associated with a spectral range of a laser to be switched off to a respective free spectral range of the remaining lasers if the number of active end nodes is reduced to $k_a \leq (m-1) \cdot p$; (d) announcing the new assignment of the spectral ranges; and (e) switching off the laser to be switched off.

Preferably, the method according to the present invention further comprises the step of: modulating the optical carrier wave of each m laser with an electrical frequency comb so that each optical carrier wave comprises several electrical subcarriers with spectral ranges for the transmission of the data to several end nodes, wherein the transmission spectra are arranged successively.

Furthermore, the method according to the present invention comprises preferably a further step of: (f) switching on a laser when the number of active end nodes increases to $k_a > (m+1) \cdot p$.

Preferably the announcement in step (d) is carried out by transmitting a joint message to all end nodes.

Preferably the announcement in step (d) is carried out by transmitting a message to the end node(s) assigned to a laser to be switched off.

According to another aspect, the present invention provides an apparatus for carrying out the method described herein.

An aspect of a method according to the present invention is based on grouping the carrier frequencies of active end nodes in a WDM-PON such that the carrier frequencies of the end nodes which are temporarily not active are combined on spectral ranges which need no longer be supplied. The flexible and adaptive regrouping of the respective carrier frequencies of the active end nodes can be realized in that the spectrum of the signal to be transmitted from the OLT is digitally generated in optical access networks with optical superheterodyne receivers and the carrier frequencies can thus be regrouped arbitrarily in the spectrum as electrical subcarriers. This technique is possible in WDM systems with wavelength selection at the receiver, which do not have wavelength-dependent couplers in the Optical Distribution Network, ODN, but where the wavelength selection takes place only at the receiver as such. To this end the optical distribution network is configured as a star network in which the signal transmitted from the central point is equally broadcast to all end nodes. The Ultra-Dense WDM-PON, UDWDM-PON, is an example for such an optical network [1].

If some end nodes pass to an inactive state and only few residual connections between the central point and the end nodes have to be maintained, the carrier frequencies of these active nodes can be combined such that they can be generated by as few lasers as possible. The remaining lasers which would be necessary for the generation of all carrier frequencies if all end nodes were active can then be switched off and thus energy can be saved. Furthermore, not only the optical interface in form of the lasers but also the electrical signal processing for generating the control signal and for generating the data packets can be switched off enabling an even higher energy saving.

For fiber optic access networks the concept of the passive optical network is a common approach in order to provide economically feasible high-bit rate subscriber access.

FIG. 1 schematically shows a conventional arrangement. The OLT, Optical Line Termination, 10 transmits signals towards the subscriber station ONT, Optical Network Termination, 11.

The power coupler 12 is the central element of the PON and distributes the signal from the OLT in downstream to all ONTs. The signals are distributed from the OLT to the end nodes in time multiplex so that every end node receives the same signal and determines the signal destined for it by choosing a time slot. In upstream the signal from the ONTs is also transmitted in the time multiplex method. In this context it is only to be considered that the ONTs are synchronized such that the signals from various end nodes do not chronologically overlap at the central power coupler. Thus, a star structure is system-inherent for a PON—contrary to the otherwise common point-to-point connections—which has effects on the operating principle. Inherently all ONTs operate with the PON system bit rate, i.e., with 2.5 Gbit/s in GPON systems [2] or 10 Gbit/s in XG-PON1 systems [4] although only relatively low bit rates are usable per subscriber—depending on the ratio 1:n. Moreover, all terminals, OLT and ONTs, are to operate at maximum total data rate since the data per terminal are selected only after the actual optical receipt. Typical quantities for n are currently 32 or 64.

Many of these disadvantages can be avoided with wavelength multiplex as the access method. In "classic" WDM-PONs every end node is assigned to a wavelength for exclusive data transmission use. Consequently, the end nodes only need to receive the data intended for them, resulting in considerably lower demands on the bandwidth or speed of the components. Moreover, only the signals are transmitted to the respective end nodes which are in fact intended for them. This leads to considerably lower loss than in a PON with power couplers which, depending on the coupling ratio, transmit only a fraction of the power to the respective output branches. A combination of both enables the increase in data rate per end node, the number of end nodes—splitting ratio—and also the maximum connection length [6].

Apart from these numerous advantages, this approach of the classic WDM-PON also involves disadvantages: First, the central power coupler has to be replaced by a wavelength-dependent splitter (typically an Arrayed Waveguide Grating, AWG), which requires a change in the network topology and thus prevents the unrestricted further use of already existing networks. Second, the optical components of the ONTs have to be constructed such that they operate at respective other wavelengths depending on which branch of the star network the relevant ONT is.

By using coherent optical reception technology the advantages of WDM-PONs can be exploited and the mentioned disadvantages can be avoided. In UDWDM-PONs the signals transmitted by the central OLT are still distributed equally to all end nodes via power couplers [5]. The network topology can remain unchanged vis-à-vis FIG. 1. Consequently, the passive network infrastructure (fiber optic cable and splitter) need not be costly rebuilt and it suffices to replace the system technology (OLT and ONT).

Figure 2:
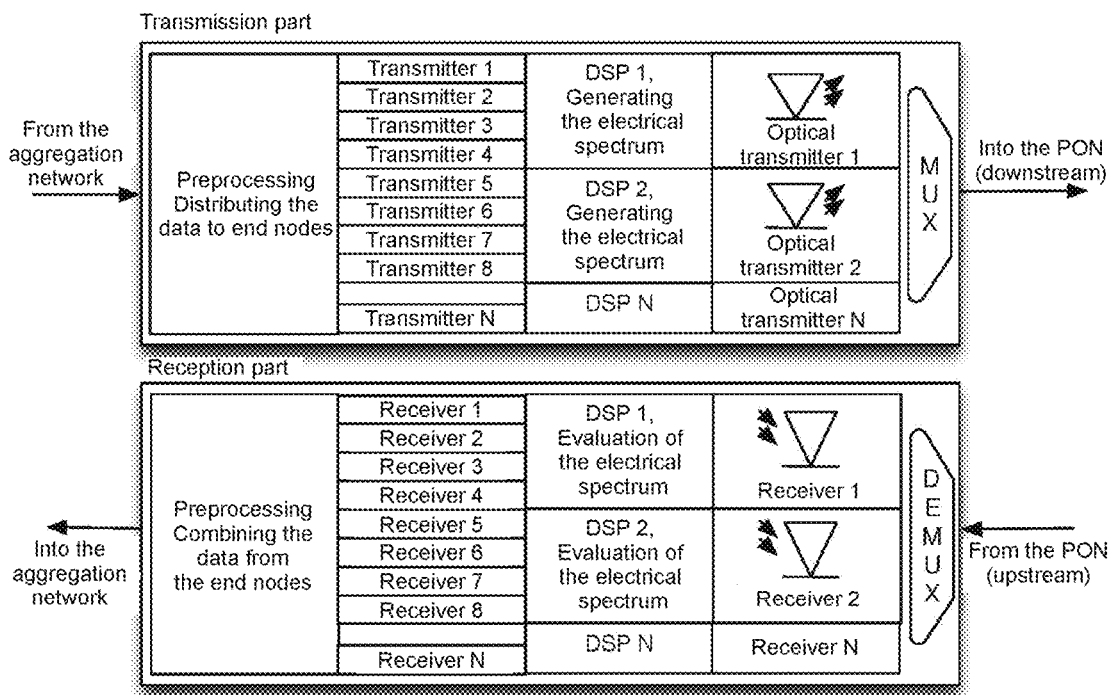
FIG. 2 shows a block diagram of an OLT for coherent WDM-PONs, wherein four carrier frequencies or channels per wavelength are shown as an example.

The signals for the individual end nodes are modulated on various subcarriers differing in their respective carrier frequency. Depending on the number of the subcarriers to be used and the respective total bandwidth, it may be possible that the various subcarriers have to be modulated on several lasers since the modulation bandwidth per wavelength is currently restricted to considerably lower than 100 GHz. Consequently, always several subcarriers are combined to blocks which are assigned to a special wavelength or a laser. Receiving the signals from the various end nodes takes place in a similar manner. The spectrum of the total signal of all end nodes is divided into smaller blocks which may then be received from a photodiode and evaluated by the electronics in total. It is expedient that this division of the total spectrum is effected by a wavelength-dependent optical splitter. The parallel processing is then effected in wavelength blocks. The principle of the signal generation and signal reception at the OLT in coherent WDM-PONs is shown by means of a block diagram in FIG. 2.

The actual selection of the wavelength to be received is effected only at the superheterodyne receiver in the end node itself [1], [5]. The superheterodyne receiver comprises a local oscillator whose wavelength can be varied. By means of this local oscillator the wavelength to be received can be selected. By superimposing the received signal with the signal of the local oscillator and subsequent conversion into an electrical signal by a photodiode, the received optical signal is down-converted to an intermediate frequency $f_{ZW}=|f_S-f_{LO}|$ with the signal frequency $f_S$ and the local oscillator frequency $f_{LO}$. For transmission (ONT side) in the upstream the laser in the local oscillator with the frequency $f_{LO}$ is used so that the two carrier frequencies for upstream ($f_{LO}$) and downstream automatically always have a fixed distance to each other, but may otherwise be freely selected by adjusting the wavelength at the local oscillator. If the local oscillator were directly used, upstream and downstream would have the same wavelength or frequency. By up-converting the upstream or downstream signal via an electronic mixer a fixed frequency distance can also be achieved which is not influenced by the properties of the laser (wavelength shift by temperature change etc.).

Contrary to a conventional WDM-PON, the downstream signal from the OLT is not realized by the modulation of different optical wavelengths created by different lasers, but digitally through generation of an electrical frequency comb. The carrier frequencies for the various end nodes of the network arise then as electrical subcarriers which are digitally generated. Thus, with one laser several end nodes are served whereby the optical carrier wavelength of the laser is modulated with an electrical frequency comb, which has been generally digitally generated and whose subcarrier carries the signals for the individual end nodes. Since the modulation bandwidth per wavelength is limited (currently at lower than 100 GHz) several lasers with different wavelengths are to be used, which are respectively modulated with electrical subcarriers.

Figure 3:
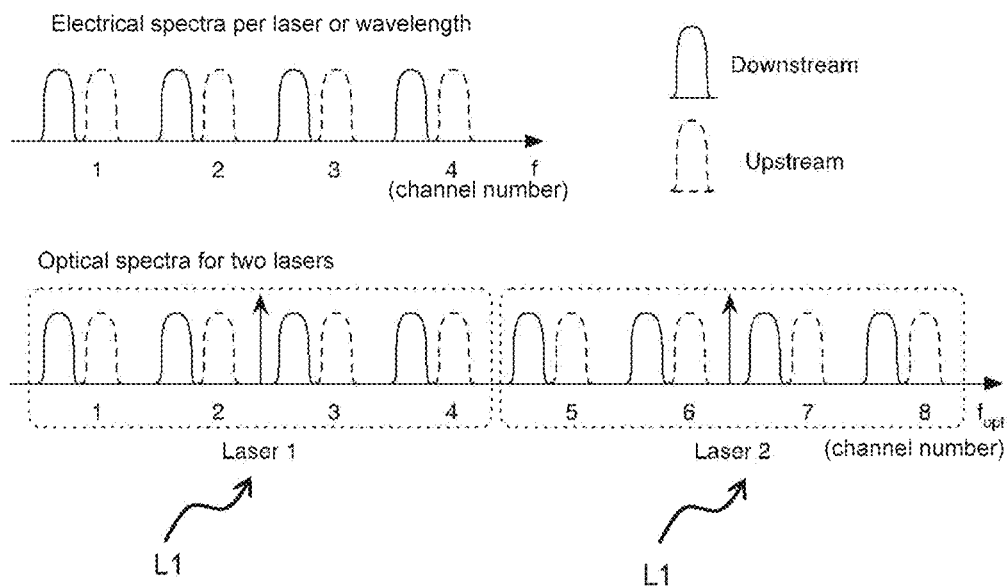
FIG. 3 shows a distribution of the carrier frequencies of the transmission spectrum to several lasers.

Assuming, e.g., a channel bandwidth of 1 GHz per customer and direction and additionally a safety distance (guard-band) of 1 GHz between two customers, respectively, approximately 3 GHz of spectrum are required per end node. Assuming further a maximum modulation bandwidth per wavelength of, e.g., 30 GHz, each laser may serve up to ten end nodes. FIG. 3 shows the OLT transmission spectrum corresponding to the prior art, wherein for the sake of clarity, only two lasers with four end nodes per wavelength, respectively, are assumed. For these exemplary eight end nodes two lasers of different wavelengths would be necessary so that the end nodes could be distributed in two groups with four end nodes per wavelength, respectively. In other words, the embodiment of the present invention shown in FIGS. 3 and 4 has the following numerical values in view of the subject-matter of the above generally described invention: m=2, p=4 and $k_a$=8.

The traffic need per participant sometimes fluctuates considerably chronologically, e.g., during a day (day/night), a week (working day/weekend) or a year (e.g., holiday period/public holidays). According to the invention, for increasing the energy efficiency, the actual bit rate to be transmitted—and processed—is adapted to the actual traffic need since the power requirement of electronic and optical components is coupled to the bit rate to be transmitted and processed—and which also increases, e.g., with increasing bit rate.

There are already defined measures for increasing the energy efficiency in PONs: In [3] there are measures for the PON variants based on the time-multiplex method, in particular for G-PON which were then included in the XG-PON1 standard [4]. All these measures, however, relate to the ONT/ONU side since it can be relatively easily activated or sent into sleep mode depending on the user activity as it concerns only one household in case of the direct fiber optic access network of households.

So far for the OLT side no load-adaptive mechanisms for increasing the energy efficiency are provided since it is difficult in the star-like PON structure to control a PON port responsible for several connections in a load-adaptive manner regarding the bit rate. The situation even gets more difficult with an increase in participants per OLT since the probability that all end nodes simultaneously enter the sleep mode becomes less likely when the number of end nodes is higher. Consequently, the OLT-PON port in current PONs is always operated with the nominal full system bit rate—which naturally always requires full power, independent of the actual activity.

With the method of the present invention, not the OLT as a whole is to be transferred to a mode of lower energy consumption but the required functions in the OLT are combined and regrouped such that individual parts of the OLT can be specifically switched off or transferred into an energy saving mode, which means that energy can also be saved at the central node of the network.

The method according to the present invention is based on that assigning the wavelengths can be adaptively controlled for every end customer. This dynamic assignment is established in WDM-PONs with coherent reception technique in that the transmission signal at the OLT has a digitally generated and modulated frequency comb which can be changed any time by simple reprogramming the control electronics. Moreover, the superheterodyne receiver enables a free selection of the wavelength to be received since, therefor, only the local oscillator in the receiver has to be adjusted to the respective wavelength to be received.

Figure 4:
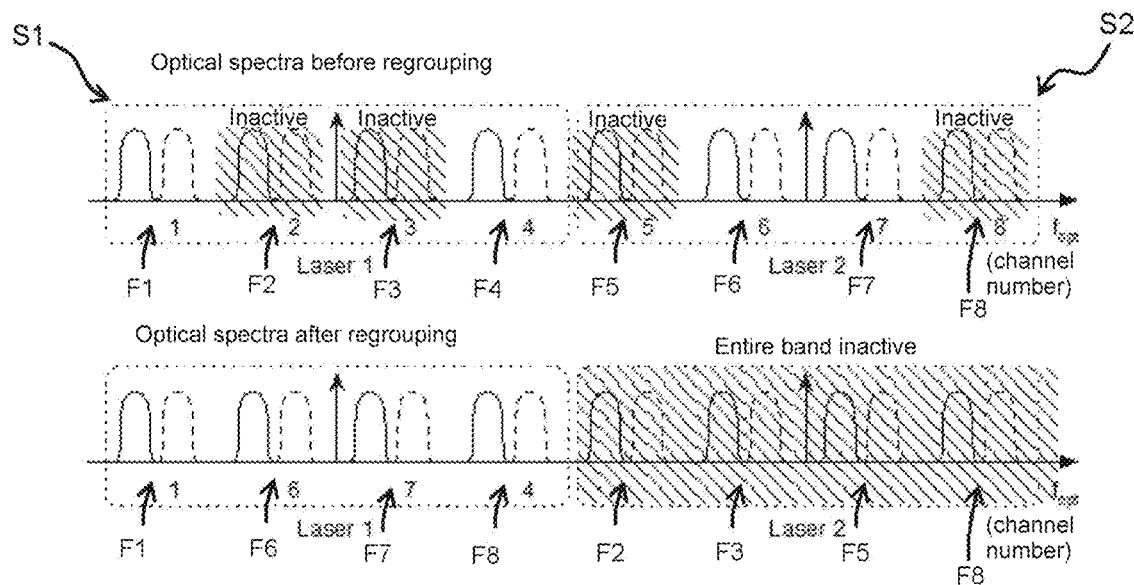
FIG. 4 shows the principle of the redistribution of the carrier frequencies of the transmission spectrum in the OLT according to an embodiment of the present invention.

When one or more end nodes enter the sleep mode in the PON, the spectrum can be arranged such by a special regrouping of the carrier wavelengths of the still active end nodes in the OLT that not all lasers of the OLT have to be used for signal generation anymore. When, as described above, e.g., 1,000 end nodes with approx. 3 GHz bandwidth per ONT, respectively, are to be addressed, altogether 3 THz bandwidth are required. A signal with such broad spectrum cannot be generated by one single modulator. The spectrum is divided to, e.g., 100 various wavelengths which are each modulated with a modulator with a bandwidth of 30 GHz. Thus, a laser can address respectively 10 end nodes. A simplified example for such a spectrum and the distribution to two different lasers with four end nodes per wavelength, respectively, is shown in FIG. 4. When, e.g., four end nodes enter the sleep mode, these four spectral ranges altogether can remain unused. The spectrum in which generally the now free areas can be distributed arbitrarily has to be regrouped subsequently such that the four spectral ranges completely occupy the spectrum of a group. It could also be said that the remaining used spectral ranges are to be rearranged such that they occupy a compact, coherent spectral range which altogether comprises a narrower bandwidth. Thus, the now spectrally narrower total signal can be generated with fewer lasers (in our example the number of required lasers reduces by one), wherein the remaining lasers, modulators, electric control and digital preprocessing can be switched off.

FIG. 4 shows a realization possibility for the spectrum prior to and after the new arrangement of the spectrum of the above example. Compared to FIG. 3, four end nodes have become inactive here, i.e., $k_a$ reduces from 8 to 4 so that the spectral ranges of the lasers are to be newly regrouped. The optical spectra S1 and S2 of the lasers L1 and L2 each comprise four spectral ranges F1, F2, F3, F4 and F5, F6, F7 and F8. Prior to regrouping, each spectrum has two spectral ranges F2 and F3 or F5 and F8 which are assigned to the inactive end nodes. Without regrouping the spectral ranges, both lasers L1 and L2 are necessary in order to supply the four still active end nodes. After regrouping the spectrum of the laser L1 only has spectral ranges F1, F6, F7 and F4 which are assigned to the still active end nodes and the spectrum of the laser L2 is exclusively occupied with inactive spectral ranges F2, F3, F5 and F8. Thus, the laser L2 can be switched off saving energy thereby.

The new assignment of the wavelengths to the respective end nodes is to be announced in the network. This can be done in various ways. For announcing in the network the new assignment one may use the fact that all end nodes receive the same signal because the distribution network is built with power couplers. Thus, a broadcast to all participants is simply realized. Hence it would be possible to simultaneously transmit to all end nodes in a wavelength-independent manner. The information could be also transmitted, e.g., as transmission signal with a suitable protocol in the same manner to all ONTs like the wanted signals themselves. For reasons of efficiency, also only the end nodes could be addressed whose carrier wavelength is to be shifted and to be announced the new channel number.

Figure 5:
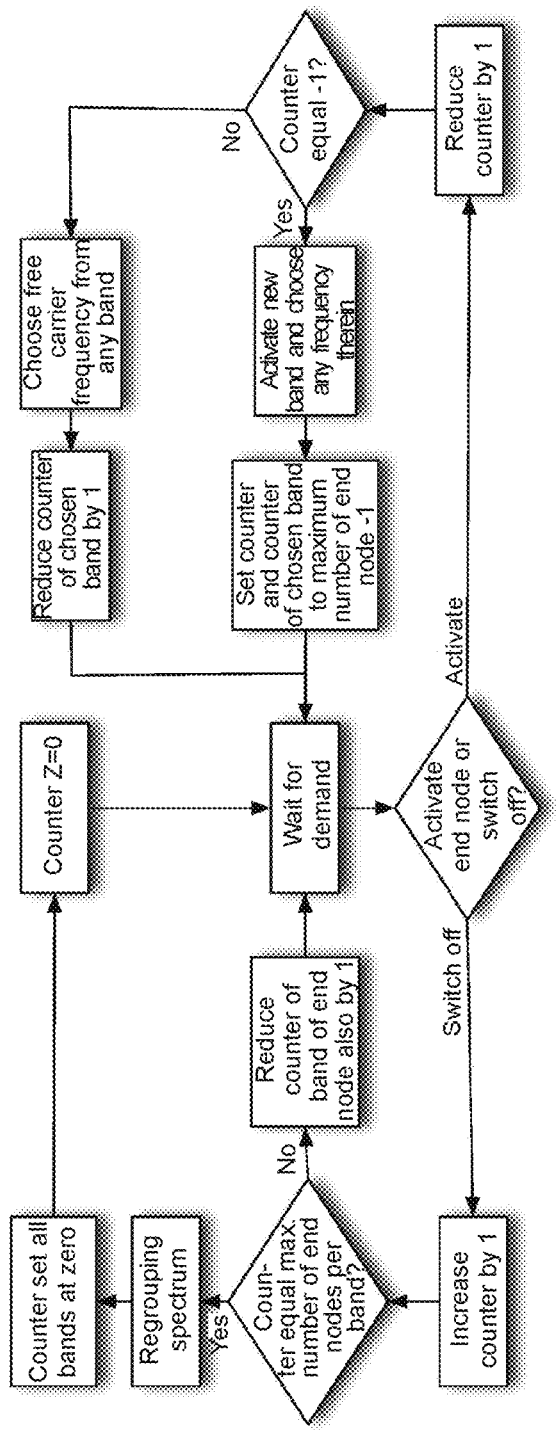
FIG. 5 shows a flow diagram for a new arrangement of the transmission frequencies according to an embodiment of the invention.

After the new arrangement of the spectrum, said assignment of the wavelengths remains. If some of the end nodes which had entered the sleep mode become active again, one of the free wavelengths can be assigned to those. However, generally one laser would have to be added again, resulting in no more energy saving: It is again shifted to a normal operation mode. A new regrouping of the spectrum is only required again when enough end nodes have become inactive so that again a complete spectral range would be free which can be supplied by one laser. In the example above, it would be ten further end nodes. For controlling the now free spectral ranges, a counter can be provided in the OLT which records the number of free spectral ranges and prompts the new arrangement of the transmission spectrum as soon as a threshold value (here 10) is reached and which is then reset. When a then inactive end node becomes active again, this counter will be reduced by one. FIG. 5 shows a flow diagram for this process.

The method according to the present invention provides the possibility to reconfigure the OLT transmission spectra in a load-adaptive manner in coherent WDM-PONs. Thus, it is possible to configure the transmission spectra such in times of low traffic load that the transmission data streams possibly distributed over all lasers are preprocessed such that they can be newly combined and consequently fewer lasers are required than for full traffic load. Thus, the lasers no longer required can be switched off including the corresponding electronics for controlling and signal processing so that during a period of reduced traffic load, the power consumption by the OLT can be reduced.

The method is specifically directed to UDWDM-PONs enabling a drastic increase in consumer numbers or the number of end nodes. Particularly for a high number of end nodes, known measures for saving energy used in point-to-point connections are ineffective. Only by using the digital signal generation at the transmitter and the thereby possible adaptive adaptation of the transmission spectrum or the new assignment of the carrier frequencies to the individual end nodes can a significant energy saving be realized in a big star network comprising a lot of end nodes.

While conventional methods try to reduce the energy consumption at the ONT, the method according to the present invention is particularly directed to saving energy at the central OLT. Besides this measure, all further methods for saving energy at the ONT side can be combined with the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for adaptive configuration of a transmission signal in a coherent Wavelength-Division Multiplexing-Passive Optical Network (WDM-PON) having an optical line termination and a plurality of end nodes, the method comprising:
   (a) generating, by at least m lasers, the transmission signal, wherein each of the at least m lasers is associated with a respective optical transmission spectrum having p associated spectral ranges, wherein a spectral range of the transmission signal is suitable for transmitting data in the coherent WDM-PON to an associated active end node of $k_a$ active end nodes, wherein a respective active end node of the $k_a$ active end nodes is associated with a spectral range of the m lasers and wherein $k_a \leq m \cdot p$, m is a positive integer and p is a positive integer;
   (b) monitoring the $k_a$ active end nodes;
   (c) if the number of active end nodes is reduced to $k_a \leq (m-1) \cdot p$:
      reassigning active end nodes associated with a spectral range of a laser to be switched off to a respective free spectral range of another laser,
      announcing the new assignment of the spectral ranges by transmitting a message to one or more end nodes assigned to the laser to be switched off, and
      switching off the laser to be switched off.

2. The method according to claim 1, further comprising:
   modulating an optical carrier wave of each of the at least m lasers with an electrical frequency comb so that each optical carrier wave comprises a plurality of electrical subcarriers with spectral ranges for transmitting data to a plurality of end nodes, wherein the transmission spectra are arranged successively.

3. The method according to claim 1, further comprising:
   (d) if the number of active end nodes increases to $k_a > m \cdot p$:
   switching on an additional laser.

4. An apparatus for adaptive configuration of a transmission signal in a coherent Wavelength-Division Multiplexing-Passive Optical Network (WDM-PON) having an optical line termination and a plurality of end nodes, wherein the apparatus is configured to:
   (a) generate, by at least m lasers, the transmission signal, wherein each of the at least m lasers is associated with a respective optical transmission spectrum having p associated spectral ranges, wherein respectively one spectral range of the transmission signal is suitable for transmitting data in the coherent WDM-PON to an associated active end node of $k_a$ active end nodes, wherein a respective active end node of the $k_a$ active end nodes is associated with a spectral range of the m lasers and wherein $k_a \leq m \cdot p$, m is a positive integer and p is a positive integer;
   (b) monitor the $k_a$ active end nodes;
   (c) reassign active end nodes associated with a spectral range of a laser to be switched off to a respective free spectral range of another laser if the number of active end nodes is reduced to $k_a \leq (m-1) \cdot p$;
   (d) announce the new assignment of the spectral ranges by transmitting a message to one or more end nodes assigned to the laser to be switched off; and
   (e) switch off the laser to be switched off.

5. The apparatus according to claim 4, further configured to:
   modulate an optical carrier wave of each of the at least m lasers with an electrical frequency comb so that each optical carrier wave comprises a plurality of electrical subcarriers with spectral ranges for transmitting data to a plurality of end nodes, wherein the transmission spectra are arranged successively.

6. The apparatus according to claim 4, further configured to:
   (f) switch on an additional laser if the number of active end nodes increases to $k_a > m \cdot p$.

* * * * *